(12) United States Patent
Shu et al.

(10) Patent No.: US 9,088,162 B2
(45) Date of Patent: Jul. 21, 2015

(54) HIERARCHICAL BATTERY MANAGEMENT SYSTEM

(75) Inventors: Ying-Haw Shu, Taipei (TW);
Feng-Yuan Wang, Taipei (TW);
Ching-Chuan Lee, Taipei (TW);
Peng-Ming Ma, Taipei (TW)

(73) Assignees: ALL NEW ENERGY TECHNOLOGY CORP., Taipei (TW);
Ying-Haw Shu, Taipei (TW)

( * ) Notice: Subject to any disclaimer, the term of this patent is extended or adjusted under 35 U.S.C. 154(b) by 377 days.

(21) Appl. No.: 13/593,332

(22) Filed: Aug. 23, 2012

(65) Prior Publication Data

US 2013/0099753 A1 Apr. 25, 2013

Related U.S. Application Data

(63) Continuation-in-part of application No. 12/253,817, filed on Oct. 17, 2008, now abandoned.

(51) Int. Cl.
*G06F 17/50* (2006.01)
*H02J 7/00* (2006.01)

(52) U.S. Cl.
CPC ............ *H02J 7/00* (2013.01); *H02J 7/0004* (2013.01); *H02J 7/0008* (2013.01); *H02J 7/0021* (2013.01); *H02J 7/0022* (2013.01); *H02J 7/0026* (2013.01); *Y02T 10/7055* (2013.01)

(58) Field of Classification Search
CPC ............ Y02T 10/7005; Y02T 10/7061; B60L 11/1866; B60L 11/1877; B60L 2240/545; B60L 2240/549; B60L 2240/662; H02J 7/0013; H02J 7/0021; H02J 7/0019; H02J 3/32; H02J 7/00; H02J 7/0004; H02J 7/0008
USPC .................................................. 320/130–136
See application file for complete search history.

(56) References Cited

U.S. PATENT DOCUMENTS

| 5,504,415 A | 4/1996 | Podrazhansky et al. |
| 6,094,031 A | 7/2000 | Shimane et al. |
| 7,511,457 B2 | 3/2009 | Emori et al. |
| 7,564,218 B2 | 7/2009 | Ooishi et al. |
| 2006/0012341 A1* | 1/2006 | Burns ........................... 320/132 |
| 2008/0185994 A1* | 8/2008 | Altemose ...................... 320/118 |
| 2010/0052615 A1* | 3/2010 | Loncarevic .................... 320/118 |

FOREIGN PATENT DOCUMENTS

WO WO 2008055505 A1 5/2008

* cited by examiner

*Primary Examiner* — Binh Tat
(74) *Attorney, Agent, or Firm* — Muncy, Geisser, Olds & Lowe, P.C.

(57) ABSTRACT

A hierarchical battery-management system mainly comprises a monitoring and equalizing module, an intermediary module, and a decision and communication module. The monitoring and equalizing module electrically couples with the battery cells, the intermediary modules electrically couple with the monitoring and equalizing module and the decision and communication module. The decision and communication module electrically couples with a power system or an electronic/electrical apparatus, and a hierarchical management structure constructed by the intermediary module to screen data and to transmit meaningful cell data to meet real time managing requirements of the large battery set.

8 Claims, 4 Drawing Sheets

HIERARCHICAL BATTERY MANAGEMENT SYSTEM

CROSS-REFERENCE TO RELATED APPLICATIONS

The present application is a Continuation-in-Part of application Ser. No. 12/253,817, filed on Oct. 17, 2008, now abandoned for which priority is claimed under 35 U.S.C. §120, the entire contents of which are hereby incorporated by reference.

BACKGROUND OF THE INVENTION

1. Field of the Invention

The present invention relates to a hierarchical battery-management system, and more particularly to a hierarchical battery-management system which comprises a decision and communication module and more than two groups. Each group comprises an intermediary module and more than two monitoring and equalizing modules, and each monitoring and equalizing module is coupled to battery cells. The intermediary module is used to link and communicate between the monitoring and equalizing module and the decision and communication module, and to extract meaningful cell data from the monitoring and equalizing module for the decision and communication module. The decision and communication module is coupled and communicates with the electrical/electronic apparatus, and therefore the electrical/electronic apparatus with this hierarchical battery-management system is able to get cell information in real time.

2. Description of the Prior Art

Presently, electric vehicles use digital interface to control the charging/discharging operation of the battery system and to monitor the residual capacity of the battery and other operating conditions. As technology evolves, battery capacity and battery power density gradually improve in order to achieve the best battery performance. It has become a trend for battery sets to cascade in serial or to connect in parallel. Therefore, it is now necessary for a battery management system to include the features of easy maintenance and partial replacement in the whole large battery system.

Most of the electronic/electrical apparatuses which use battery as main power system or backup system have built in digital interfaces to monitor the status of the whole battery system. Through a digital interface, the electronic/electrical apparatus can estimate the residual capacity of the battery system and issue a warning signal when the battery does not function normally. Lead-acid batteries are more popular for use in large batteries than lithium based batteries because the latter have a high risk of exposure and burning when used in a large battery system. Also, lead-acid batteries have the advantages of low cost and easy maintenance. In a system using lead-acid batteries, the lead-acid battery has high endurance in over voltage and low voltage conditions and can handle the problem of being slightly over-charged by electrolysis and heat dissipation. Therefore, the battery monitoring system of lead-acid batteries focuses on monitoring the battery capacity rather than issues of battery-cell voltage balance or voltage monitoring for a single battery. The battery monitoring system of lead-acid battery tends to be simple and uses only a simple digital transmission interface to communicate with the electronic/electrical apparatus. As the development trends towards electrical vehicles and applying Lithium based batteries, the battery monitoring system has to monitor much more battery cell information than only the battery capacity. Battery weight is an important factor for energy efficiency of the electric vehicle. It is therefore necessary to reduce the battery weight to increase the loading capacity and to improve battery sustainability. The LiFePO4 battery or the improved Li—$MnO_2$ battery can now meet the safety and working temperature requirements of electric vehicles or large power systems. However, Lithium based batteries have to deal with over voltage/low voltage problems due to their low internal resistance and high charging efficiency to ensure the use thereof. For a large power system, it is necessary to use tens to thousands of battery cells to cascade in serial or to connect in parallel to achieve the required capacity and operating voltage. Such a battery set is implemented using a plurality of battery packs to facilitate voltage monitoring of modules, even each single battery. A traditional battery protecting module, due to a smaller number of battery cells, uses traditional industrial transmission interface (such as IEEE485/IEEE488), local interconnect network (Lin Bus), or control area network (CAN 2.0B) to monitor and communicate with the battery packs.

Please refer to FIG. 1 for a cascading structure of all cells' monitors communicating with the decision/master unit. The structure comprises a set of monitoring and equalizing modules (Label 001, 002 . . . 108), a decision and communication master 0011 and a power system (vehicle control unit or center control unit) 0012. Each monitoring and equalizing module is connected to a battery cell. Wherein, 108 monitoring and equalizing modules communicate with each other by parallel or serial interface 0021. The power-system control unit 0012 provides electricity to the decision and communication master 0011. The decision and communication master 0011 is connected to 108 monitoring and equalizing modules, and to deal with different operating voltages and a cascading digital interface to facilitate 108 monitoring and equalizing modules if there are 4 battery cells under each monitoring and equalizing module to be monitored, under a fast transmission mode, a battery system with 108 sets of monitoring and equalizing modules still takes 1.53 seconds to transmit the status data of the battery. In this figure, the transmission rate is 19,200 bps, and every 8 bit data needs a transmission time of 11 bits, the downlink command comprises four 8-bits, and the maximum response delay time of the monitoring and equalizing module is 5 ms. Thus, the communication time for the battery system is $(11*(4+12)/19200+0.005)*108=1.53$ second), which raises a concern regarding reliability in the operation of real time monitoring of the electric vehicle or large backup power system (UPS).

From the above descriptions, the traditional battery management systems tend to have the following problems:

1. Large battery set has safety concerns due to its high voltage and large capacity. Furthermore, the costs and weight of a large battery set are reasons why it has to be segmented into sub-sets to reduce maintenance costs.

2. Large battery set uses a lot of battery cells and has a safety limit for the number of batteries connected in parallel. Also, there are more battery packs to monitor simultaneously. As the capacity and number of batteries increases, more monitoring modules are required and more monitoring data is generated. More data requires more resources from the transmission interface and increases the delay time for the battery management system to obtain data from each cell monitoring module. Additionally, each responding battery cell data may have different reference time index.

3. Furthermore, the operating voltages of protection boards of battery sets are different, the difference between operating voltages may be 300 to 500 volts. Under this circumstance, the traditional controller-area network (CAN-bus) or star network is not available for such a high voltage.

4. The center controller of the control area network (CAN-bus) or star network must monitor many components rather than only battery packs in an electrical/electronic system. Thus, there might be an unacceptable delay or network configuration problems when connecting all the battery packs in parallel.

5. Due to increasing demand of electricity, the number of battery packs connecting to power network in cascading configuration or in parallel greatly increases, which means the amount of data will increase as well. Therefore, the amount of data transmitted on the interconnect network explodes and causes more delay during the transmission. This delay in data transmission could lead to untimely decision and affect the decision result.

Therefore, the traditional battery management systems present several shortcomings to be overcome.

In view of the above-described deficiencies of the traditional battery management system, after years of constant effort in research, the inventor of this invention has consequently developed and proposed a hierarchical battery-management system in the present invention.

SUMMARY OF THE INVENTION

It is an object of the present invention to provide a hierarchical battery-management system, which uses an intermediary module to screen and transmit meaningful cell data to meet real time managing requirements of large battery set.

It is an object of the present invention to provide a hierarchical battery-management system, which can effectively reduce the amount of data required for managing batteries to speed up the decision process and to cut down the time required for the power system controller to obtain the status information of the battery set, so as to meet real-time monitoring requirements of the power system.

In order to achieve the above objects, the present invention discloses a hierarchical battery-management system, which comprises a monitoring and equalizing module, an intermediary module and a decision and communication module Due to maintenance and operation requirements of a large power system, the large battery set is segmented into a plurality of battery packs. Therefore, it would be easier to manage the plurality of battery sets if the battery management system is constructed in a hierarchical structure. With such a hierarchical structure, the data required for battery monitoring can be processed and screened in advance, the amount of the screened data is greatly reduced, and the decision time is shortened through parallel processing of each segmented battery pack.

In conclusion, the present invention is summarized as following:

A hierarchical battery-management system, comprising: a decision and communication module; an intermediary module, wherein the intermediary module in a group records all of cell voltages and cell temperatures in the group, screens cell information to get a maximum, minimum, and average of the cell voltages and temperature as a group status, and feeds the group status to the decision and communication module; a monitoring and equalizing module, wherein the monitoring and equalizing module gets cell voltages and cell temperatures in the group, and feeds the cell information to the intermediary module in the group, and receives balancing control information through the intermediary module; wherein the hierarchical battery-management system comprises more than two groups, each group has one intermediary module and more than two monitoring and equalizing modules, and the decision and communication module only electrically couples with the intermediary module which is set in each group, and the intermediary module only electrically couples with the monitoring and equalizing modules which is set in each group; and wherein the decision and communication module feeds the balancing control information to each intermediary module after getting all groups status or deciding a balancing command, and makes decisions of low-voltage and over-voltage protection for the hierarchical battery-management system to enhance a response speed.

In the embodiment the intermediary module is based on a micro-controller unit, the intermediary module simultaneously gets all of cell voltages and cell temperatures through the monitoring and equalizing modules in the group or other low intermediary module, wherein the intermediary module screens cell information to get the maximum, minimum, and average of the cell voltages and temperatures as a group status, and feeds the group status to the decision and communication module or other upper intermediary module, and the upper intermediary module is able to treat the low intermediary module in the group as quasi monitoring and equalizing modules, and to treat the group statuses of the low intermediary modules as quasi cell information.

In the embodiment the intermediary module further comprises an isolated up-link digital interface and an isolated down-link digital interface, the intermediary module gets the group status through the monitoring and equalizing modules to feed the design and communication module or other upper intermediary module by the isolated up-link digital interface, and receives the balancing control information of the design and communication module or upper intermediary module appropriately to feed the monitoring and equalizing modules or other low intermediary module by the isolated down-link digital interface.

In the embodiment the monitoring and equalizing module further comprises an analog to digital reading element, an equalizing element, an isolated digital interface and a control unit, wherein the analog to digital reading element is responsible for getting the cell information for corresponding battery cells, equalizing element accomplishes a corresponding processing according to the balancing command of the intermediary module, the isolated digital interface is responsible for sending the cell information to the intermediary module, and the control unit is responsible for converting the cell information to a data format for the intermediary module.

In the embodiment the decision and communication module is based on a micro-controller unit which further comprises an isolated up-link digital interface and an isolated down-link digital interface, the decision and communication module communicates between a power-system control module and the intermediary modules and receives the group statuses from the intermediary modules of all groups to decide the protection functions of the hierarchical battery-management system, and decides the balancing control information according to a balancing command to feed the intermediary modules.

In the embodiment the power-system control module electrically couples with the decision and communication module, and the power-system control module is a vehicle control unit or a center control unit.

DETAILED DESCRIPTION OF THE PREFERRED EMBODIMENT

Figure 1:
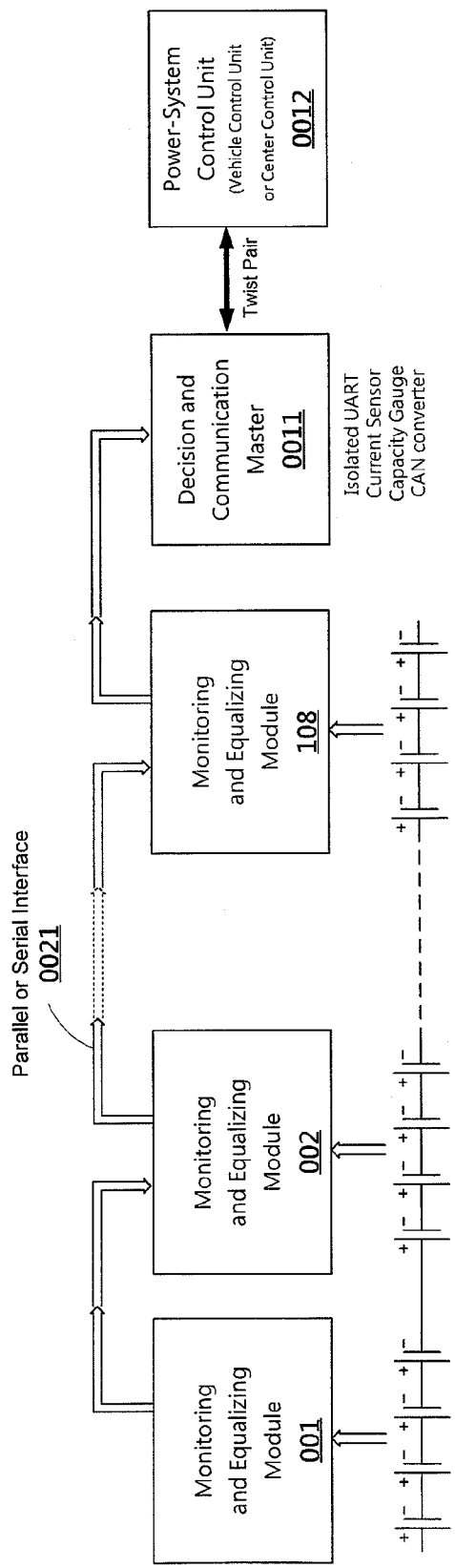
FIG. 1 illustrates a traditional structure of a digital transmission interface.
Figure 2:
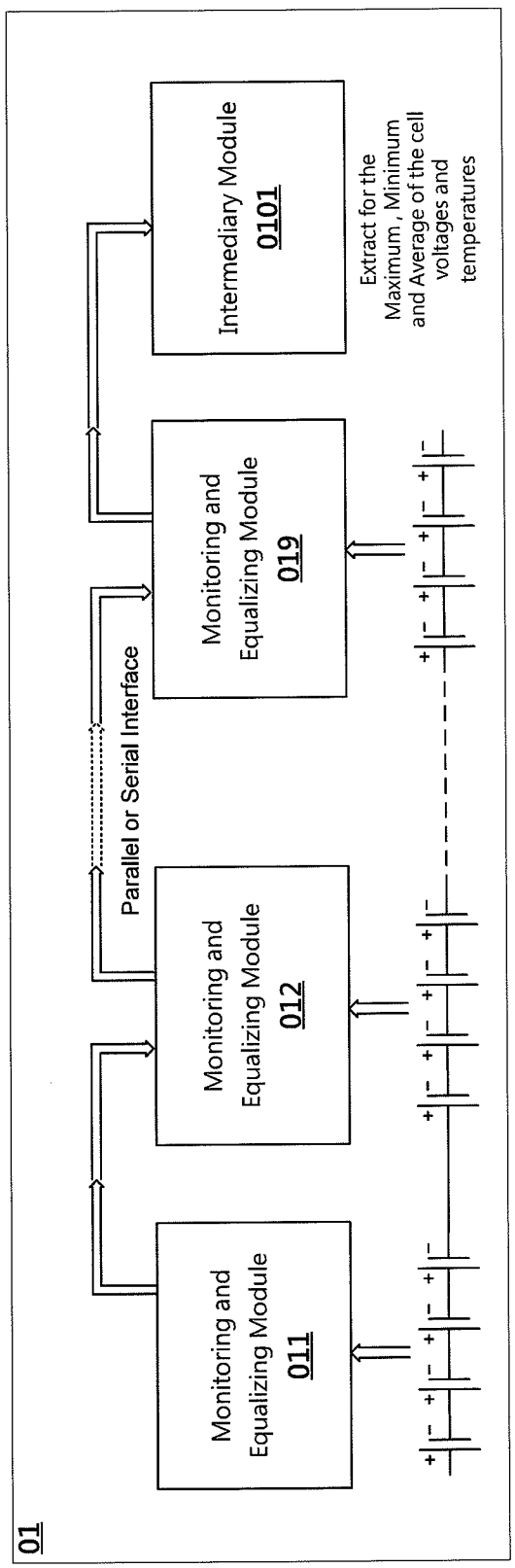
FIG. 2 illustrates a segmented battery pack structure of a hierarchical battery-management system in the present invention.

Please refer to FIG. 2, which illustrates a segmented battery pack structure of a hierarchical battery-management system in the present invention, the hierarchical structure comprises:

Nine sets of monitoring and equalizing modules (label 011 to 019) in this segmented battery pack 01 couple with an intermediary module 0101 and directly connect with the battery; furthermore, each monitoring and equalizing module (label 011 to 019) has its communicating interface connected in parallel or serially to one of another monitoring and equalizing module, and it reads the battery cell voltage and battery cell temperature and transmits four sets of voltage data and one set of temperature data to the intermediary module 0101. When the intermediary module 0101 requests the battery cell voltages and battery cell temperatures provided by the nine sets of the monitoring and equalizing modules (label 011 to 019), the total amount of requesting data is 36 sets of voltage data and 9 sets of temperature data.

The intermediary module 0101 couples with the nine sets of monitoring and equalizing modules (label 011 to 019) for recording the voltage of each battery cell and temperature value of the monitoring point in advance, and also for screening effective and useful data related to the monitoring and equalizing modules (label 011 to 019) at the same time, for the decision and communication module. In one embodiment of the present invention, the requested data comprises the maximum, minimum, and average of cell voltages, and the highest, lowest, and average temperatures.

Figure 3:
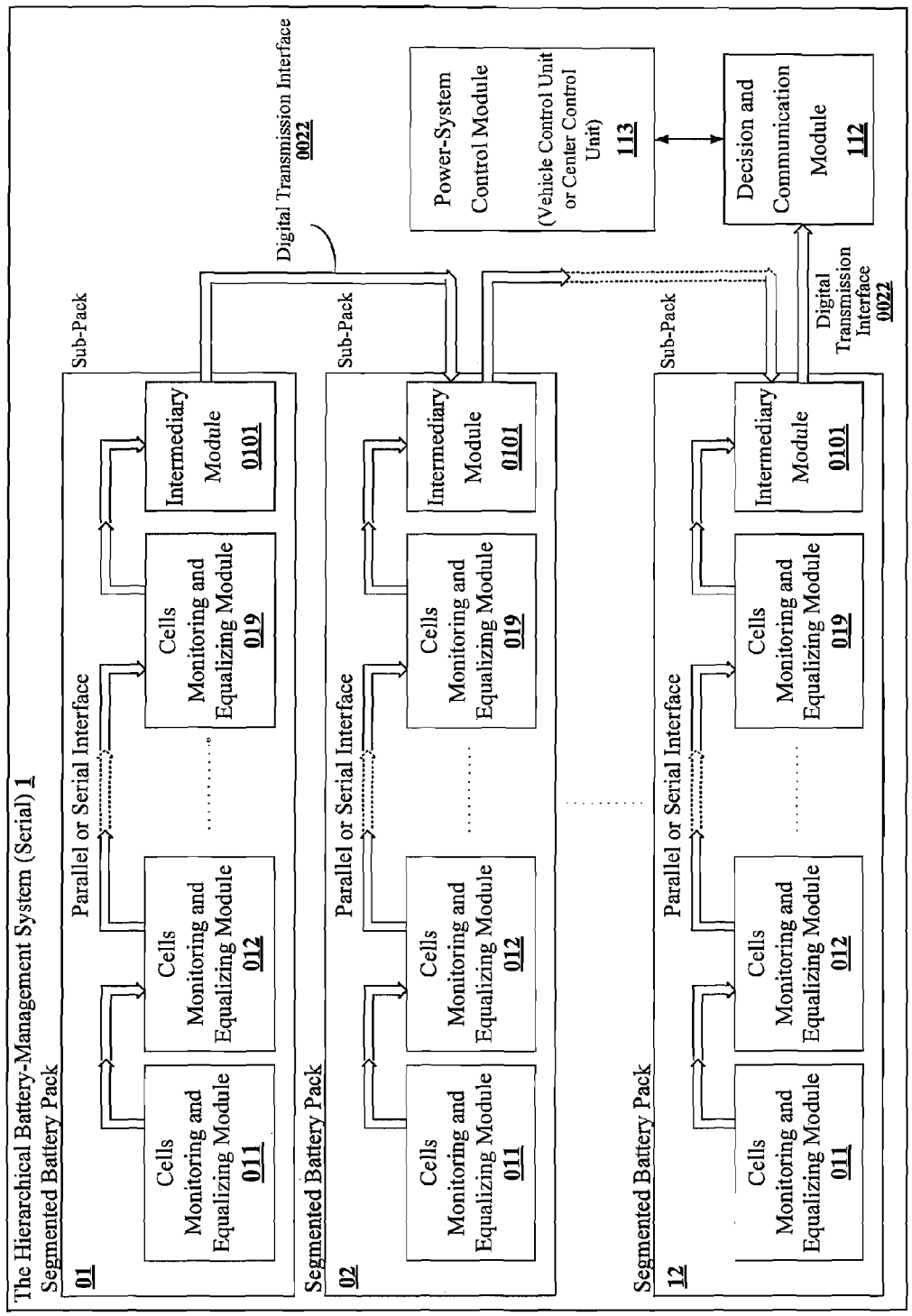
FIG. 3 illustrates a first embodiment of the hierarchical battery-management system.

Please refer to FIG. 3, which illustrates a first embodiment of the hierarchical battery-management system (serial) 1, the hierarchical structure for managing the battery packs in serial configuration comprises:

For the sake of easy connection of signal cables, the digital transmission interfaces 0022 of the intermediary modules 0101 are also connected in serial configuration. Therefore, the first set of the twelve sets of segmented battery packs 01 couples its external digital transmission interface 0022 with the second set of the twelve sets of segmented battery packs 02 thereof, and so on, and the twelfth set of segmented battery packs 12 couples with the decision and communication module 112. The twelve sets of segmented battery packs (label 01, 02, 03 . . . 12) are coupled with one another sequentially, and with nine monitoring and equalizing modules and an intermediary module 0101 in each one of the segmented battery packs. The monitoring data of the battery cell is processed and screened by the internal intermediary module 0101 in advance, and then it is transmitted to the decision and communication module 112 through the digital transmission interface 0022 between each segmented battery pack. Digital signals representing the maximum, minimum, and average of battery cell voltages can be transmitted to the decision and communication module 112 through the common digital transmission interface 0022.

The decision and communication module 112 couples with the twelfth set of segmented battery packs (label 01, 02, 03 . . . 12) and a power-system control module 113. The power-system control module 113 presents a human interface, controls other peripheral components, and gets the battery system status from the decision and communication module 112. Therefore, the power-system control module 113 is also called the vehicle control unit or center control unit. The decision and communication module 112 determines an operation instruction to keep the battery cell voltage balance of the whole battery system. The instruction is transmitted through the intermediary modules 0101 of the twelve sets of segmented battery packs (label 01, 02, 03 . . . 12) to each monitoring and equalizing module (label 011, 012 . . . 019). The decision and communication module 112 can also connect to the power system or the electrical/electronic apparatus.

This fast and efficient battery management system greatly reduces the transmission time of digital data and shortens the response time for the monitoring and equalizing module. Furthermore, this hierarchical battery-management system is applicable to more layers of ranked intermediary modules for battery management, to keep the response time of the monitoring and equalizing module as low as possible without being affected by the increasing capacity of the battery set, which will be more clearly presented in FIG. 4.

Figure 4:
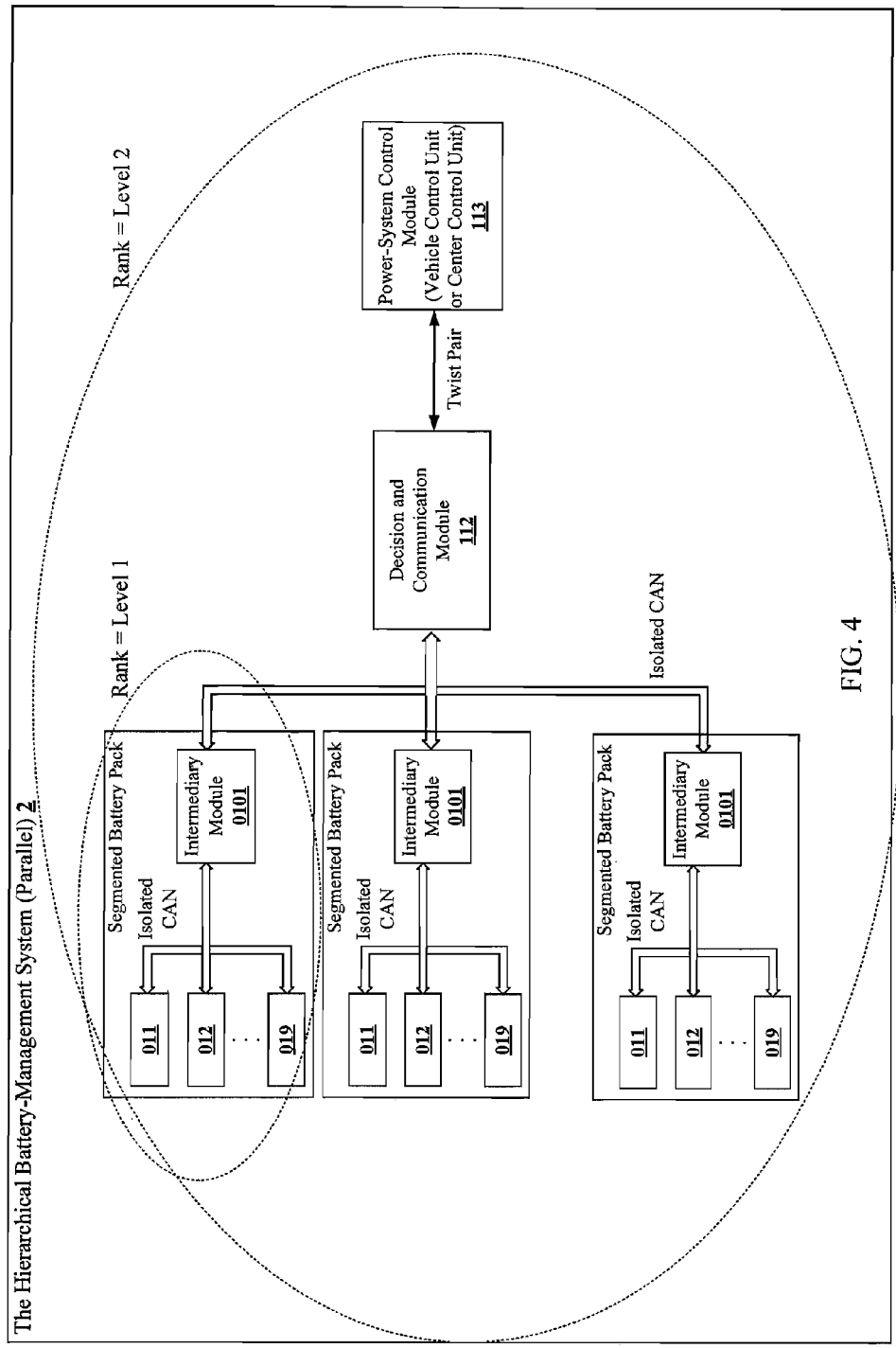
FIG. 4 illustrates a second embodiment of the hierarchical battery-management system.

Please refer to FIG. 4, which illustrates a second embodiment of the hierarchical battery-management system, the hierarchical structure for managing the battery packs (connected in parallel configuration) comprises:

Twelve sets of segmented battery packs (label 01, 02, 03 . . . 12), each one group, the segmented battery packs (label 01, 02, 03 . . . 12) couples with the decision and communication module 112, with nine monitoring and equalizing modules (label 011 to 019) and an intermediary module 0101 in each one group, the segmented battery pack; the nine monitoring and equalizing modules (label 011 to 019) coupling with the intermediary module 0101 respectively. The intermediary module 0101 in each group gets and records all of cell voltages and cell temperatures in its group, screens the cell information to get the maximum, minimum and average of the cell voltages and temperature as its group status, and feeds its group status to the decision and communication unit 112. The decision and communication module 112 feeds back the balancing control information to the intermediary 0101 module after getting all of group status or getting the balancing command from the upper control unit, and makes the decisions of low-voltage and over-voltage protection for the hierarchical battery-management system. Since all intermediary modules 0101 get cell information from their twelve sets of monitoring and equalizing units (label 011 to 019) at the same time, and deliver their screened group status to the decision and communication unit 112, the whole hierarchical battery-management system has a fast response and efficiently balancing command reflecting to the cell status.

The decision and communication module 112 of that large group in the FIG. 4 can be the upper intermediary module, and treat the low intermediary module in each small group as the quasi monitoring and balancing unit. In such a case, the upper intermediary module of the large group also treats the small group status as the quasi cell information. That is, to treat the maximum, minimum, and average of cell voltages and cell temperatures in each small group as the maximum, minimum, and average of cell voltages and cell temperatures in each monitoring and equalizing unit. Also, the final decision and communication unit is able to quickly define the balancing command, if the groups are uniform. Therefore, our hierarchical battery management system is able to extend the corresponding concept of the small group and large group, and therefore, multi-ranked groups, to the huge battery system.

The present invention discloses a hierarchical battery-management system, which compared with other prior art battery management systems, is advantageous in:

1. The present invention discloses a hierarchical battery-management system, which uses intermediary modules to screen and transmit meaningful cell data, to meet requirements of the power system for real-time monitoring and management of large battery set.

2. The present invention discloses a hierarchical battery-management system, which can easily manage a large battery set by introducing a hierarchical management structure, to reduce the amount of data required for managing batteries and to shorten the time for the power system controller to obtain the status information of the large battery set.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A hierarchical battery-management system, comprising:
    a decision and communication module;
    an intermediary module, wherein the intermediary module in a group records all cell voltages and cell temperatures in the group, screens cell information to get a maximum, minimum, and average of the cell voltages and temperature as a group status, and feeds the group status to the decision and communication module;
    a monitoring and equalizing module, wherein the monitoring and equalizing module gets cell voltages and cell temperatures of a plurality of battery cells, feeds the cell information to the intermediary module in the group, and receives balancing control information through the intermediary module;
    wherein the hierarchical battery-management system comprises more than two groups, each group has one intermediary module and more than two monitoring and equalizing modules, and the decision and communication module only electrically couples with the intermediary module which is set in each group, and the intermediary module only electrically couples with the monitoring and equalizing modules which is set in each group; and
    wherein the decision and communication module feeds the balancing control information to each intermediary module after getting all groups' statuses or deciding a balancing command, and makes decisions of low-voltage and over-voltage protection for the hierarchical battery-management system without sequentially polling each cell-level module, to increase communication and enhance a response speed of the management system.

2. The hierarchical battery-management system of claim 1, wherein the intermediary module is based on a micro-controller unit, the intermediary module simultaneously gets all cell voltages and cell temperatures through the monitoring and equalizing modules in the group or other low intermediary module, wherein the intermediary module screens cell information to get the maximum, minimum, and average of the cell voltages and temperatures as a group status, and feeds the group status to the decision and communication module or other upper intermediary module, and the upper intermediary module is able to treat the low intermediary module in the group as quasi monitoring and equalizing modules, and to treat the group statuses of the low intermediary modules as quasi cell information.

3. The hierarchical battery-management system of claim 2, wherein the intermediary module further comprises an isolated up-link digital interface and an isolated down-link digital interface, the intermediary module gets the group status through the monitoring and equalizing modules to feed the design and communication module or other upper intermediary module by the isolated up-link digital interface, and receives the balancing control information of the design and communication module or upper intermediary module appropriately to feed the monitoring and equalizing modules or other low intermediary module by the isolated down-link digital interface.

4. The hierarchical battery-management system of claim 1, wherein the monitoring and equalizing module further comprises an analog to digital reading element, an equalizing element, and an isolated digital interface and a control unit, wherein the analog to digital reading element is responsible for getting the cell information for corresponding battery cells, the equalizing element accomplishes a corresponding processing according to the balancing command of the intermediary module, the isolated digital interface is responsible for sending the cell information to the intermediary module, and the control unit is responsible for converting the cell information to a data format for the intermediary module.

5. The hierarchical battery-management system of claim 1, wherein the decision and communication module is based on a micro-controller unit which further comprises an isolated up-link digital interface and an isolated down-link digital interface, the decision and communication module communicates between a power-system control module and the intermediary modules and receives the group statuses from the intermediary modules of all groups to decide the protection functions of the hierarchical battery-management system, and decides the balancing control information according to a balancing command to feed transmit to the intermediary modules.

6. The hierarchical battery-management system of claim 5, wherein the wherein the power-system control module electrically couples with the decision and communication module, and the power-system control module is a vehicle control unit or a center control unit.

7. A hierarchical battery-management device comprising:
    a decision and communication module, wherein the decision and communication module receives a plurality of group status feeds and controls the status of a plurality intermediary control modules;
    an intermediary control module, wherein the intermediary control module records all cell voltages and cell temperatures in the group, consolidates cell information from a plurality of monitoring and equalizing modules into a group status, and feeds the group status to the decision and communication module;
    a monitoring and equalizing module, wherein the monitoring and equalizing module gets cell voltages and cell temperatures, feeds the cell information to the intermediary module in the group, receives balancing control information through the intermediary module, and controls operating voltages at a plurality of battery cells;
    wherein the decision and communication module feeds the balancing control information to each intermediary module after deciding a balancing command based on the group status information, and makes decisions of low-voltage and over-voltage protection for the hierarchical battery-management system.

8. The hierarchical battery-management device of claim 7, wherein the decision and communication module is based on a micro-controller unit which further comprises an isolated up-link digital interface and an isolated down-link digital interface, the decision and communication module communicates between a power-system control module and the intermediary modules and receives the group statuses from the intermediary modules of all groups to decide the protection functions of the hierarchical battery-management device, and decides the balancing control information to transmit to the intermediary modules.

* * * * *